Sept. 27, 1960 G. KIPER 2,954,099
SPRING POWER MECHANISM
Filed March 2, 1959 2 Sheets-Sheet 1

INVENTOR:
*Gerd Kiper*
BY
*Connolly and Hutz*
ATTORNEYS

Patented Sept. 27, 1960

2,954,099
SPRING POWER MECHANISM

Gerd Kiper, Munich, Germany, assignor to Agfa Aktiengesellschaft, Leverkusen-Bayerwerk, Germany, a corporation of Germany Filed Mar. 2, 1959, Ser. No. 796,614

Claims priority, application Germany Mar. 29, 1958

6 Claims. (Cl. 185—38)

This invention relates to an unwinding mechanism and a control therefor in a spring power mechanism having a spring mounted between a winding shaft and a rotating spring housing.

It is rather common to lock or stop a spring power mechanism, for example, of the type used in a motion picture camera before it completely unwinds to provide a substantially uniform unwinding speed through its range of operation. It is not difficult to provide a suitable unwinding control for a power spring mechanism which is wound up in one direction and unwinds in the other direction because the force of the spring can be restrained directly at the center of the rotation of the spring. However, in a spring power mechanism where winding is accomplished in one direction, for example, in a clockwise direction, and unwinding occurs in the same direction, it is common to use unwinding stops whose control elements are only temporarily disengaged without being absolutely locked to prevent changes of position during disengaged periods of operation. These stopping devices are, therefore, not completely foolproof in operation.

An object of this invention is to provide a simple and economical spring power mechanism which is substantially foolproof in operation.

Another object is to provide such a mechanism having an unwinding control which permits rewinding during any phase of tensioning.

In accordance with this invention, a transmission gearing is provided between the winding shaft and spring housing of a spring power mechanism which incorporates this spring housing rotatably mounted about the winding shaft. This transmission gearing incorporates a projection means or pin which engages an operating lever. The positional phase of the transmission gearing, as indicated by the positional phase of the projection means attached thereto, is indicative of the relative positions of the spring housing and winding shaft or the degree of unwinding or running down of the spring. Basically, this transmission gearing may be used when either the winding shaft or spring housing is maintained stationary. However, the principal advantage of this invention, which is maintenance of continuous control over the spring tension, is only provided when both elements to which the spring is secured are rotatable. In using an embodiment of this invention, one is not limited to only one definite winding path for the spring which must be fully transversed before it can be rewound. To the contrary, this invention permits additional tension to be imparted to the spring from any starting position within its range of tension when it is used, for example, in a motion picture camera. This permits the running length of any future picture-taking sequence to be extended to the full range of the spring by rewinding before shooting regardless of the amount of tension remaining in the spring.

In accordance with another aspect of this invention, a stopping arrangement is provided which is operatively associated with transmission gearing including a projection disposed in the path of the operating or stopping lever. The positional phase of this stopping arrangement relative to a stationary reference point is indicative of the relative positions of the winding shaft and the spring housing. It is advantageous to employ for this purpose a planetary gearing having a first sunwheel which is attached to the winding shaft and a second sunwheel which carries the control arrangement. The winding motion is limited by a stop disposed in the path of the control device.

It is further helpful to provide a camming surface upon the operating lever. One part of this camming surface is used to limit the winding motion of the spring by contact with the control device. Another part of this camming surface which is, for example, formed as a wedge, is disposed substantially perpendicularly to the direction of the projection upon the transmission gearing to permit this projection to move the lever in a direction to stop the unwinding of the spring. Furthermore, this operating lever may be manually operable.

Novel features and advantages of the present invention will become apparent to one skilled in the art from a reading of the following description in conjunction with the accompanying drawings wherein similar reference characters refer to similar parts and in which.

Figure 3:
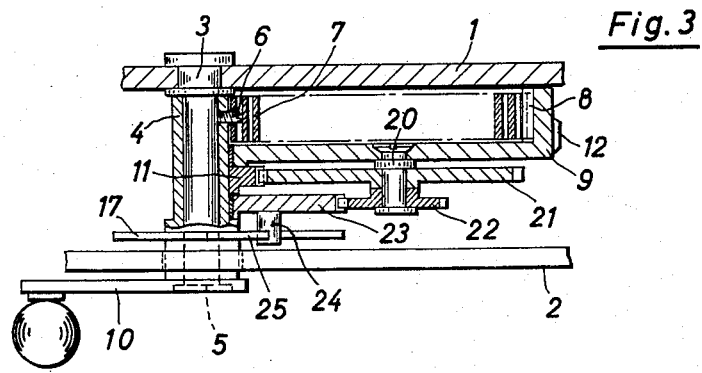
Fig. 3 is a cross-sectional view taken through Fig. 1, along the line III—III.

In Fig. 3 are shown two walls 1 and 2 of a motion picture camera in which is installed a power spring mechanism of this invention. Spindle 3 is, for example, rigidly mounted upon wall 1; and a winding shaft 4 which is, for example, made hollow is rotatably mounted upon spindle 3 and axially secured thereto, for example, by lock washer 5. Retaining means, for example, set screw 6 secures the inner end of a flat coil spring 7 to winding shaft 4. The other end 8 of coil spring 7 is attached to the inner surface of a hollow spring housing 9 which is rotatably mounted upon winding shaft 4. Crank 10 which is secured to winding shaft 4 is rotated to tension coil spring 7. Shaft 4 is maintained in its wound phase through a locking mechanism (not shown) which is, for example, a spring-loaded pawl which may engage gear 11 which is rigidly secured to shaft 4, or it may engage a special ratchet wheel (also not shown). Spring housing 9, through a gear transmission, for example, provided by an external gear 12 formed about its periphery and a pinion gear 14, drives shaft 13, for example, of a camera mechanism to which pinion gear 14 is secured. A stop means including two locking teeth or surfaces 15 is secured to shaft 13, and these stopping lugs 15 cooperate with a stop surface formed upon an operating or stopping lever 17. This lever 17 is rotatably mounted about pin 18 secured to the camera housing, and it projects through a slot in the camera housing (in a manner not shown) to make manually-operable handle 19 shown in Fig. 2 easily accessible to an operator.

Figure 1:
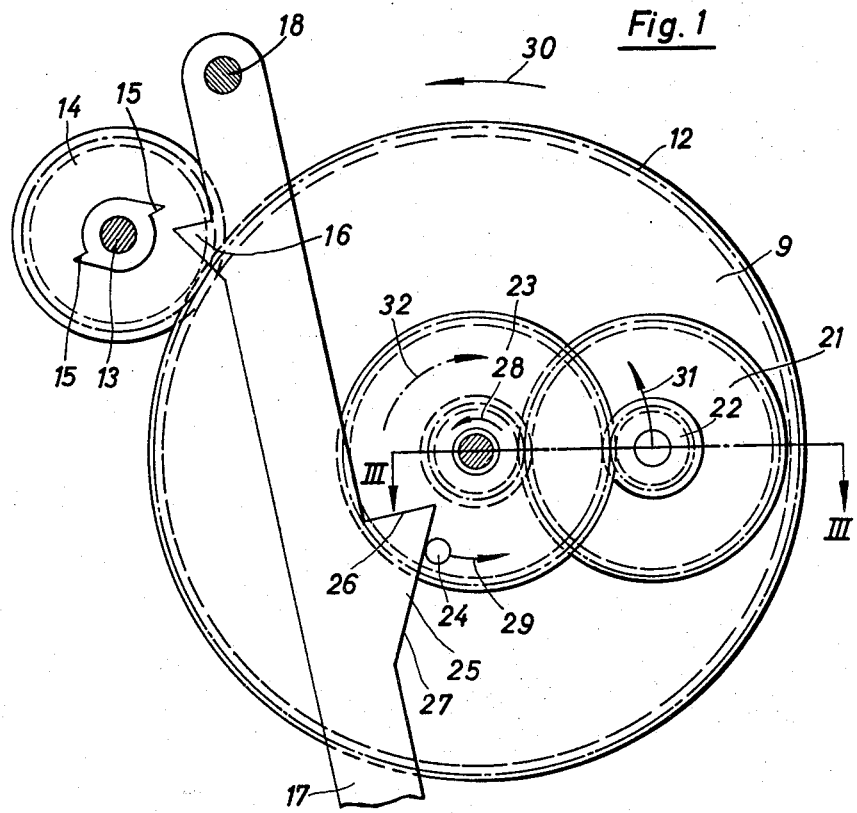
Fig. 1 is a plan view of a schematic diagram of one embodiment of this invention in the nearly completely unwound condition, for example, in a form useful in a motion picture camera.

The transmission gearing includes two planetary gears 21 and 22 which are secured to each other or made in one piece. These planetary gears 21 and 22 are rotatably mounted upon a spindle 20 secured to spring housing 9. Gear 21 engages sunwheel 11 which is secured to winding shaft 4 whereas planetary gear 22 engages sunwheel 23 which is rotatably mounted about winding shaft 4 and includes a projection means 24 which is, for example, made in the form of a tripping pin. The transmission train including gears 11, 21, 22, and 23 is designed to permit the spring to be completely wound when tripping pin 24 moves through less than one complete revolution. Pin 24 projects into the path of a camming element 25 secured to operating lever 17. One surface 26 of camming element 25 is substantially perpendicularly disposed relative to the longitudinal axis of lever 17, and the other surface 27 of camming element 25 is substantially disposed at an angle to the axis of lever 17 in a direction substantially perpendicularly disposed to the direction of movement of tripping pin 24 in the positional phase through which it moves when the spring mechanism is in its unwound phase as shown in Fig. 1. This causes pin 24 to contact surface 27 as shown in Fig. 1 and rotate lever 17 to the viewer's left, whereby stop surface 16 on lever 17 is moved into the path of one of locking projections or stops 15 on drive shaft 13 to arrest motion of the camera mechanism. Lever 17 can be moved again by the operator to the viewer's right to release stop 15 only when winding shaft 4 has been wound in the direction of arrow 28 sufficiently to rotate pin 24 through the transmission gearing in the direction of arrow 29 into a tensioned positional phase. When coil spring 7 is completely wound, pin 24 is moved to the position shown in Fig. 2 where it is arrested upon surface 26 of camming element 25 to prevent overtensioning of the spring.

Figure 2:
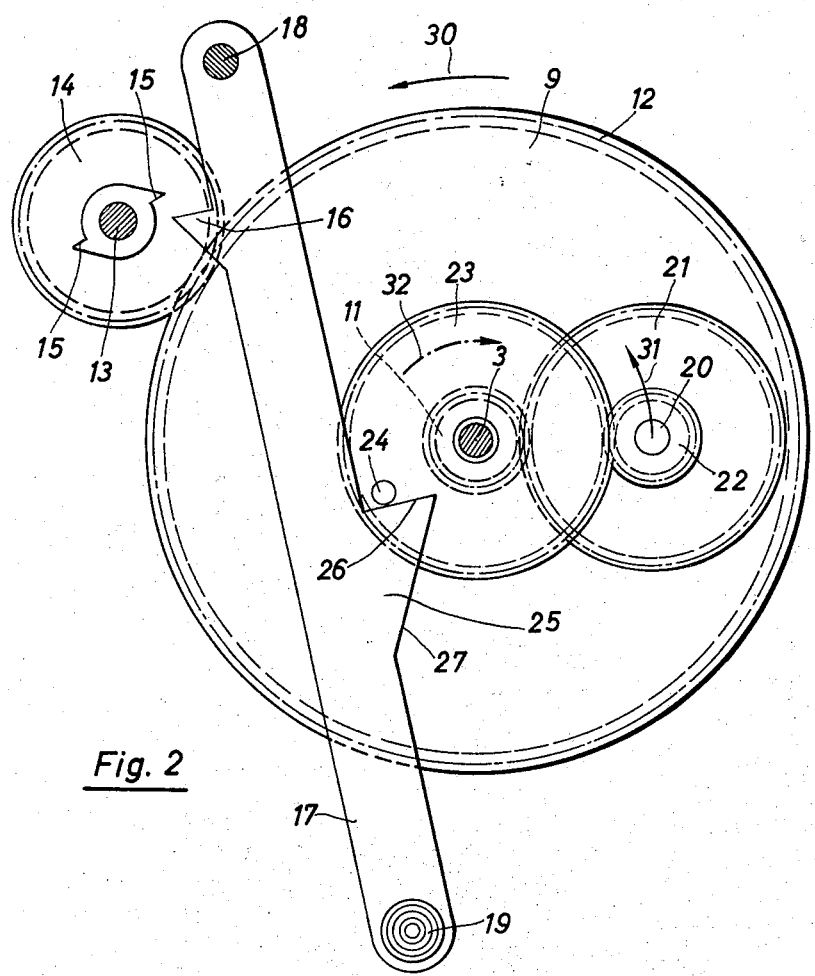
Fig. 2 is a plan view similar to that of Fig. 1 in the completely tensioned condition.

When lever 17 is moved to the viewer's right from the position shown in Fig. 2, spring housing 9 is permitted to rotate also in counter-clockwise direction corresponding to arrow 30 to drive camera mechanism shaft 13 through pinion 14. At the same time, planetary gear 21 rotates together with spring housing 9 about winding shaft 4 and sun gear 11 in a counter-clockwise direction as represented by arrow 31. The rotational motion of gear 21 is imparted through gear 22 secured thereto to sungear 23 which is rotatably mounted about winding shaft 4. This imparts a clockwise rotation in the direction of arrow 32 shown in broken line to sun gear 23, thereby moving pin 24 back to its original position which is shown in Fig. 1. Pin 24 is thereby always maintained in intimate relationship with spring housing 9 and winding shaft 4 through the transmission gearing including gears 23, 22, 21 and 11. Pin 24 thereby indicates by a comparison of its position relative to a stationary part of the camera the degree of tensioning of the spring at any given moment. This mechanism permits the spring to be wound to any given degree of tensioning from any starting position without losing control over its amount of tensioning. Furthermore, the indication of the degree of tensioning provided by the comparison of the position of pin 24 with a stationary reference point (not shown) upon the housing of the camera permits an operator to adjust the amount of tension to that required at any particular moment. This is particularly advantageous in a motion picture camera where the operator can rewind the spring sufficiently before shooting a sequence to carry him entirely through the sequence without stopping.

What is claimed is:

1. A spring power mechanism comprising a rotatably mounted winding shaft, a spring housing rotatably mounted about said shaft, a coil spring mounted within said housing, the inner end of said coil spring being attached to said shaft and the outer end of said coil spring being attached to said housing, a driven shaft rotatably mounted adjacent said housing, transmission gearing connecting said housing with said driven shaft to permit said coil spring to rotate said driven shaft as it unwinds, a stop means connected to said driven shaft, projection means attached to said transmission gearing, an operating lever movably mounted adjacent said stop means and said transmission gearing, said operating lever including a stop surface for engaging said stop means to arrest said driven shaft, said operating lever including a camming element for engagement by said projection means to move said stop surface into the path of movement of said stop means for arresting said driven shaft when tensioning of said spring has substantially run down and said projection means is disposed in a predetermined positional phase relative to said operating lever, and said camming element being constructed and arranged to permit said stop surface of said operating lever to be moved out of the path of said stop means upon said driven shaft when said transmission gearing is in a positional phase relative to said operating lever other than said predetermined positional phase.

2. A spring power mechanism as set forth in claim 1 wherein a reference point is provided upon a stationary portion thereof for comparison with said projection means upon said transmission gearing for indicating the degree of tensioning of said spring to an operator.

3. A spring power mechanism as set forth in claim 1 wherein said transmission gearing includes planetary gears rotatably mounted upon a spindle secured to said spring housing, a sun gear engaged with one of said planetary gears is secured to said winding shaft, and a sun gear engaged with the other of said planetary gears carries said projection means and rotates freely about said winding shaft.

4. A spring power mechanism as set forth in claim 1 wherein a portion of said camming element is disposed substantially perpendicular to the path of movement of said projection means when said transmission gearing is in a completely tensioned positional phase to provide a stop means to prevent said coil spring from being overtensioned in winding.

5. A spring power mechanism as set forth in claim 1 wherein said camming element upon said operating lever is wedge-shaped, said transmission gearing includes a sun gear rotatably mounted upon said winding shaft, said projection means being comprised of a tripping pin mounted upon said sun gear, one part of said wedge-shaped camming surface upon said operating lever being disposed substantially perpendicular to the direction of movement of said tripping pin in a tensioned phase to prevent overwinding of said spring, and the other portion of said wedge-shaped camming surface being disposed substantially perpendicular to the direction of movement of said tripping pin in a positional phase corresponding to an unwound condition of said spring to permit said tripping pin to move said operating lever in a direction to engage said stop surface thereon with said stop means upon said driven shaft for arresting said driven shaft before said coil spring is allowed to completely unwind to a relaxed state.

6. A spring power mechanism as set forth in claim 5 wherein said stop surface is positioned upon one side of said operating lever, and said wedge-shaped camming surface is positioned upon the other side of said camming lever to permit its movement by hand away from said driven shaft to permit said coil spring to unwind when said tripping pin has been rotated by winding of said spring power mechanism to a tensioned positional phase other than said predetermined positional phase to move it out of the path of movement of said wedge-shaped camming surface.

References Cited in the file of this patent

UNITED STATES PATENTS

| | | |
|---|---|---|
| 1,418,251 | Ginshirg | May 30, 1922 |
| 1,426,128 | Uber | Aug. 15, 1922 |
| 2,698,066 | Favret | Dec. 28, 1954 |